United States Patent [19]

Lyu et al.

[11] Patent Number: 5,204,829
[45] Date of Patent: Apr. 20, 1993

[54] INTERLEAVING OPERATIONS IN A FLOATING-POINT NUMERIC PROCESSOR

[75] Inventors: Allen Lyu, Milpitas; Charles Stearns, San Jose, both of Calif.

[73] Assignee: LSI Logic Corporation, Milpitas, Calif.

[21] Appl. No.: 911,854

[22] Filed: Jul. 10, 1992

[51] Int. Cl.⁵ .............................................. G06F 7/38
[52] U.S. Cl. .................................... 364/748; 364/754
[58] Field of Search ............... 364/748, 736, 754, 752, 364/761

[56] References Cited

U.S. PATENT DOCUMENTS 4,999,801  3/1991  Katsuno ............................. 364/748

OTHER PUBLICATIONS

Taylor, "Radix 16 SRT dividers with overlap quotient selection stages", IEEE, Sep. 1985, pp. 64–71.
Montoye et al., "Design of the IBM RISD system/6000 floating-point execution unit," IBM J. Res. Develop., vol. 34, No. 1, Jan. 1990, pp. 59–70.
Birman et al., "Developing the WTL 3170/3171 Spare Floating-Point Coprocessors", IEEE/Feb. 1990, pp. 55–63.
Steiss et al., "A 65 MHz Floating Point Coprocessor for a RISE Processor," IEEE, Mar. 1991, pp. 60–61, 94–95 & 250.

Primary Examiner—Tan V. Mai
Attorney, Agent, or Firm—Gerald E. Linden; Michael D. Rostoker

[57] ABSTRACT

A pipelined floating point multiplier is disclosed having the capability of interleaving floating point multiplication with iterative floating point operations (calculations), such as division and square-root taking, by making use of idle stages (pipeline bubbles). This is accomplished with minimal additional circuitry over that required for conventional floating-point multipliers, and does not adversely affect the speed of iterative calculations. Method and apparatus are disclosed.

10 Claims, 5 Drawing Sheets

INTERLEAVING OPERATIONS IN A FLOATING-POINT NUMERIC PROCESSOR

TECHNICAL FIELD OF THE INVENTION

The invention relates to digital numeric processing systems, and more particularly to high-performance digital floating-point numeric processors employing a pipelined multiplier architecture.

BACKGROUND OF THE INVENTION

Floating point numeric processors, often called Floating Point Units or FPU's, are digital circuits which perform arithmetic manipulations on floating point numbers. Before the advent of today's large-scale integrated circuit technology, floating-point computations were usually performed entirely in software on computers capable of performing only integer arithmetic. This required that all manipulations of the mantissa and exponent, including normalization, had to be performed as separate programmed steps. Typically, the minimum set of floating point operations provided included the four basic arithmetic operations of addition, subtraction, multiplication and division. Higher level functions such as the square root function were performed by iterative calls to the basic arithmetic functions. The software methods were (and are) effective, but slow. In response to a desire for greater floating point computational performance, limited floating-point "accelerators" were built which provided a sufficient degree of hardware assistance to these software manipulations to improve the speed of floating-point calculations significantly, often by an order of magnitude or more.

Eventually, dedicated floating point processors were built which were capable of performance approaching 1,000,000 floating point operations per second (one "megaflop" or "Mflop"). An example of such a processor is the i8087 math co-processor produced by Intel Corporation of Santa Clara, Calif. for use in conjunction with its 8086 and 8088 microprocessors. Further technological advances have improved the speed and functionality of devices of this type. Once considered a significant luxury, math co-processors are becoming increasingly commonplace in personal computer systems.

As hardware and software techniques developed and "real-time" digital signal processing became more practical, new applications such as flight simulation, digital audio, and interactive digital video arose. Higher and higher levels of sophistication in these applications, however, demand increasingly higher levels of floating-point performance. As a result, the FPU has become an important component of many of today's high-performance microprocessor systems, and is often provided on the microprocessor chip itself. Many of today's high-speed RISC (Reduced Instruction Set Computer) processors and DSP's (Digital Signal Processors) often employ dedicated on-chip floating-point hardware (FPU's).

Many of today's floating-point applications require iterative "multiply-accumulate" (multiplication, addition, and storage of the result in cascaded operations) steps. In order to maximize performance of these applications, it has become customary to provide separate hardware in an FPU for addition and multiplication, and registers to receive the accumulated result(s).

Of the functions commonly performed by FPU's (add, subtract, multiply, divide, and square root), the most time-consuming and complicated are the divide and square root functions. A great deal of study and research has gone into finding highly efficient techniques for performing the divide and square root functions. Of the resulting techniques, three have become popular for implementation in FPU's: the Newton-Raphson method, the Goldschmidt method, and the SRT algorithm. The underlying premise of all three techniques is that they are based upon iterative operations and exhibit rapid convergence. The SRT algorithm is discussed in "Radix 16 SRT Dividers With Overlapped Quotient Selection Stages", George S. Taylor, IEEE Pub. CH2146-9, 1985 (hereinafter "SRT85").

In order to implement these division and square root methods in dedicated hardware, floating-point computation hardware is necessary which provides holding registers for intermediate results and which provides feedback paths by which these intermediate results may be re-entered into the floating point computation hardware. Further, a sequential control mechanism is required which will control the order of iterative processing. One floating-point processing unit which incorporates these principles is described in "The TMS390C602A Floating Point Coprocessor for Sparc Systems", Darley et. al., pp. 36–46, IEEE Micro, June 1990 (hereinafter "TI90"). FIGS. 2, 3, and 4 therein are substantially reproduced herein as FIGS. 1a, 1b, and 1c, respectively.

Other modern FPU's embodying the principles described hereinabove are described in "Developing the WTL30170/3171 Sparc Floating-Point Coprocessors", IEEE Micro, February, 1990, pp. 55–63 (hereinafter "WEIT90"; "A 65 MHz Floating-Point Coprocessor for a RISC Processor", Steiss et. al., IEEE ISSCC 1991, Session 5, Microprocessors, Paper TA 5.3 (hereinafter "HP91"); "Design of the IBM RISC System 6000 floating-point execution unit", Montoye, Hokenek and Runyon, IBM J. Res. Develop., vol 34, no. 1, pp. 59–70, January 1990 (hereinafter "IBM90"); and "i860 Microprocessor Architecture", Intel Corporation, pp. 140–145, 1990, (hereinafter "INTL90").

The TMS390C602A, described in TI90, is a typical modern FPU, and is shown in block diagram form in FIG. 1a (substantially reproduced from TI90). The FPU 100, comprises a fetch unit 102, a load unit 104, a decode unit 106. an exceptions/floating-point state register unit 108, a dependency checking unit, an execution unit/floating-point queue 112, a register file 114, a storage unit 116 and a floating point math unit 150. Fetch unit 102, decode unit 106, execution unit 112, and dependency checking unit 110 operate together as a sequential controller to operate the remainder of the FPU. Internal floating-point data buses 135 and 136 permit exchange of floating-point data between the load unit 104, register file 114, exceptions/floating-point state register unit 108, floating-point math unit 150 and storage unit 116. It should be noted that internal data bus 135 provides "feedback" access from the floating-point math unit 150 to the register file 114, permitting automated iterative procedures. It is through the use of this feedback path that the floating-point divide and square root operations are accomplished.

Floating point math unit 150 further comprises a floating-point addition/subtraction unit and a pipelined floating-point multiplication unit. FIG. 1b is a block diagram of the floating point addition/subtraction unit 150a. In the floating point addition/subtraction unit 150a, an A input operand 151a is received by an A input register, and a B input operand 151b is received by a B input register 152b. The output of A input register 152a is connected to the input of a type check register 154a, which validates the format of the floating point number presented at its input by input register 152a. Similarly, the output of the B output register 152b is connected to the input of a type check register 154b. The outputs of the two type check registers 154a and 154b have the validated A and B input operands, respectively. Both operands are applied to the inputs of an exponent comparison unit 156 and a swapping unit 158, which determine which input operand will be subjected to an alignment process by alignment unit 160. The "aligned" input operand is applied to one input of an ALU 162 (essentially an adder/subracter for the mantissas), while the other input operand is applied to the other input of the ALU 162. The resultant output of ALU 162 determine whether exponent adjustment and normalization are required. If necessary, these operations are performed by exponent adjustment unit 164 and normalization unit 166, respectively. After normalization, the result is rounded to an appropriate level of precision by rounding unit 167, and the newly calculated mantissa and exponent are placed in sum output register 168, which presents them as a result at its output.

FIG. 1c is a block diagram of the pipelined floating-point multiplier portion 150b of floating-point math unit 150 (FIG. 1a). This is a two-level pipelined multiplier, with input registers 170a and 170b forming the inputs to the pipelined multiplier, pipeline and divide register 184 dividing the multiplier into two parts, and product register 190 forming the final pipeline register. From the time inputs are available in input registers 170a and 170b, two clocks are required before a result output is seen at the output of the product register 190.

As shown in FIG. 1c, an A operand 171a and a B operand 171b are received by A operand register 170a and B operand register 170b respectively. The outputs of these registers are subjected to type checking in 172a and 172b, respectively. Input registers 170a and 170b, and type checking blocks 172a and 172b are similar to input registers 152a and 152b and type checking blocks 154a and 154b (FIG. 1b) in the floating point addition/subtraction unit 150b.

Two multiplexers, 174a and 174b select whether "straight-through" or "feedback" operation is to be used. "Straight-through" operation is when the inputs to the multiplier are taken from the input registers. "Feedback" operation is when one or both of the inputs to the multiplier are taken from one of the later pipeline stages. Multiplexer 174a selects whether a first input to the ensuing multiplication process will be taken from the A operand (via A type checking 172a) or from the pipeline and divide register 184. Multiplexer 174b selects whether a second input to the ensuing multiplication process will be taken from the B operand (via B type checking 172b) or from the product register 190. The controlling signals for the multiplexers (not shown) come from execution unit 112 (FIG. 1a), according to the sequencing required by the instruction being executed. For a simple floating-point multiplication, straight-through operation will be selected. For certain of the iterative processes, (e.g., divide and square) it is necessary to "feed back" intermediate results from pipeline and divide register 184 and/or product register 190.

The outputs of multiplexers 174a and 174b are applied to a multiplication circuit comprising an "×3" (binary integer multiply-by-three) function block 178, a radix-8 re-coder 180, and a sign-digit multiplier 182. An exponent ALU 176 combines the exponents of the two input operands. The result of the multiplication (from 182 and 176) is stored in pipeline and divide register 184. The output of pipeline and divide register is applied to exponent incrementer 186, which increments the exponent of the result of the multiplication, as necessary, depending upon the results of the mantissa calculation. A sign digit conversion unit 188 and rounding/normalization unit 189 put the mantissa in the proper format. The final mantissa (from 189) and the final exponent (from 186) are stored in the product register as the final result output of the floating-point multiplier.

It should be noted that the multiplexers 174a and 174b are provided specifically for the purpose of implementing iterative calculations such as division and square root taking. As described in TI90 these calculations are performed using the "Goldschmidt" algorithm, which is similar to the Newton-Raphson method.

While the division and square root operations are performed very efficiently by this hardware structure, it can be seen from the description in TI90 that the floating-point multiplier circuitry is dedicated to the operation in progress. That is, if a division is being performed, then the floating-point multiplier is dedicated to the division operation until it is completed. Similarly, if a square root is being calculated, then the floating-point multiplier is dedicated to the square root function until it is completed.

Although their internal organizations differ somewhat, the FPU's described in INTL90, IBM90, and HP91, (Intel i860, IBM RS/6000 FPU, and HP PA-RISC, respectively), perform the divide and square root functions similarly, and their respective floating-point multiplication units are dedicated to those iterative calculation processes (division or square-root taking) until they are completed.

These pipelined floating point multipliers, as a result of this dedicated mode of operation when applied to iterative calculations, cause some pipeline sections to be unused at some processing steps, leaving one or more "bubbles" in the pipeline. A pipeline "bubble" occurs when one whole pipeline stage (level) of a pipelined architecture is unused during one clock cycle. Typically, this occurs between two multi-cycle multiplications where the second multiplication uses the result of the first. Once the second clock cycle of the first multiplication occurs, the first stage of the pipeline is unused (creating a "bubble") because the next multiplication is held off until the first one completes. The bubble in the first stage propagates through the pipeline leaving successive stages unused during successive clock cycles until a final cycle when the bubble "pops" upon reaching the final stage where there are no further stages for it to propagate into. These pipeline "bubbles" result in less than full hardware utilization. Accordingly, maximum hardware efficiency is not realized.

Another approach which can be taken is to provide separate (parallel) hardware for iterative floating-point calculations, independent of the floating-point multiplier. For example, a separate divide/square-root unit may be provided, allowing division or square-root taking to proceed independent of multiplication. This dramatically improves throughput at the expense of additional hardware.

This parallel hardware approach is the approach taken for the FPU described in WEIT90 (Weitek WTL3170/3171 FPU), which provides separate hardware for floating-point multiplication and for floating-point division/square-root. The multiplication and division share only small amounts of circuitry in common, and so it is possible to have multiplication and division simultaneously in progress. This, however, does require substantial additional circuitry, which will remain unused during many operations, lowering overall hardware utilization efficiency.

Table 1, below, lists the commercially available FPU's (or processor with embedded FPU's) discussed hereinabove, indicating in separate columns whether or not each employs separate hardware for the floating point multiply and divide/square functions, the algorithm used by each for the division and square root functions, whether or not each is capable of simultaneous multiplication and division, whether or not each is capable of simultaneous multiplication and square root calculation, and the applicable reference document.

TABLE 1

| Product | Sep. H/W for mult, div/sqrt? | Div/sqrt Algorithm | Simult. mult/div | Simult. mult/sqrt | Ref. |
|---|---|---|---|---|---|
| WTL3170/3171 | Y | SRT | Y | Y | WETT90 |
| TI TMS390C602A | N | Goldschmidt | N | N | TI90 |
| Intel i860 | N | Newton-Raphson | N | N | INTL90 |
| IBM RS/6000 | N | Similar to Newton-Raphson | N | N | IBM90 |
| HP PA-RISC | N | Goldschmidt | N | N | HP91 |

As can be seen in Table 1, above, none of the FPU's which do not provide separate divide/square root hardware are capable of concurrent (simultaneous) multiplication and division or concurrent multiplication and square-root taking. The only FPU which does provide the capability of concurrent multiplication and divide/-square-root does so by providing separate (parallel) hardware for that purpose.

DISCLOSURE OF THE INVENTION

It is therefore an object of the present invention to provide a single floating-point multiplier capable of supporting concurrent multiplication and division.

It is a further object of the present invention to provide a single floating-point multiplier capable of supporting concurrent multiplication and square root taking.

It is a further object of the present invention to provide a floating point multiplier capable of making use of idle stages (pipeline bubbles) in iterative calculations.

It is a further object of the present invention to accomplish all of the above objects without requiring substantial additional circuitry over and above that of a "normal" prior-art floating-point multiplier.

According to the invention, a pipelined floating-point multiplier is provided which is adapted to square-root calculation and division by providing suitable result feedback circuit to the input of the multiplier. In addition to the "normal" clocked registers provided for input values and output values, two additional sets of registers are provided, the first being a set of "bypass" or "interleaf" input registers and the second being a set of "bypass" or "interleaf" output registers. The multiplication circuitry is adapted so that it will select, if so commanded by controlling circuitry, the output of the bypass input registers as its inputs. The interleaf output registers are provided at the final stage of the pipeline as an additional location for output value storage, separate from the output storage registers located in the feedback path used for divide and square-root operation.

When a bubble occurs in the first pipeline stage of the multiplier, it may be "filled" by setting the input of the multiplier to receive the. This is accomplished by setting the multiplier to use the interleaf input registers as its inputs, thus beginning an "interleaved" multiply operation. This interleaved multiplication will propagate through the remainder of the pipelined multiplier in place of the bubble. At the final stage of the pipelined multiplier, the result of the interleaved multiplication is stored in the interleaf output registers, making it separately available for use.

There are three primary architectural differences between prior art floating-point multipliers and the present invention: 1) the present invention adds input registers ("bypass" or "interleaf" registers) which are used to insert operands for interleaved multiplications; 2) means are additionally provided in the present invention for the selection of the added input registers as inputs to the multiplier during otherwise idle (bubble) cycles; and 3) at least one set of additional output registers ("interleaved result registers") is provided for the storage of the result of interleaved multiplications.

Procedurally, in order to perform interleaved multiplications, making use of the present invention, it is necessary to have analyzed iterative sequences in advance and identified pipeline bubbles. Whenever a bubble occurs at the first pipelined stage of the floating-point multiplier, the multiplier inputs are switched (via the means provided in the present invention) to select the values stored in the "interleaf" registers. When the now-filled bubble (containing the results of an interleaved multiplication) reaches the end of the pipeline (last stage) then the result is stored in the "interleaved result registers", completing the interleaved multiplications.

By analyzing the sequence of division and square-root operation, bubbles in their operation may be identified and filled with multiplication operations. This is accomplished without any time penalty to the divide or square root operation whatsoever. The amount of additional circuitry required to accomplish this is simply an additional set of input registers, an additional set of output registers, and the circuitry required to select them and route their inputs and/or outputs appropriately. This is an extremely small amount of additional circuitry compared to the circuitry of a floating-point multiplier.

Other objects, features and advantages of the invention will become apparent in light of the following description thereof.

BRIEF DESCRIPTION OF THE DRAWINGS

FIG. 1b is a block diagram of a floating point adder used in the FPU of the prior-art floating-point co-processor of FIG. 1a.

FIG. 1c is a block diagram, of a floating point multiplier used in the FPU of the prior-art floating-point co-processor of FIG. 1a.

FIG. 2b depicts a sequential controller suited to controlling the floating point multiplier of FIG. 2a.

DETAILED DESCRIPTION OF THE INVENTION

Figure 1A:
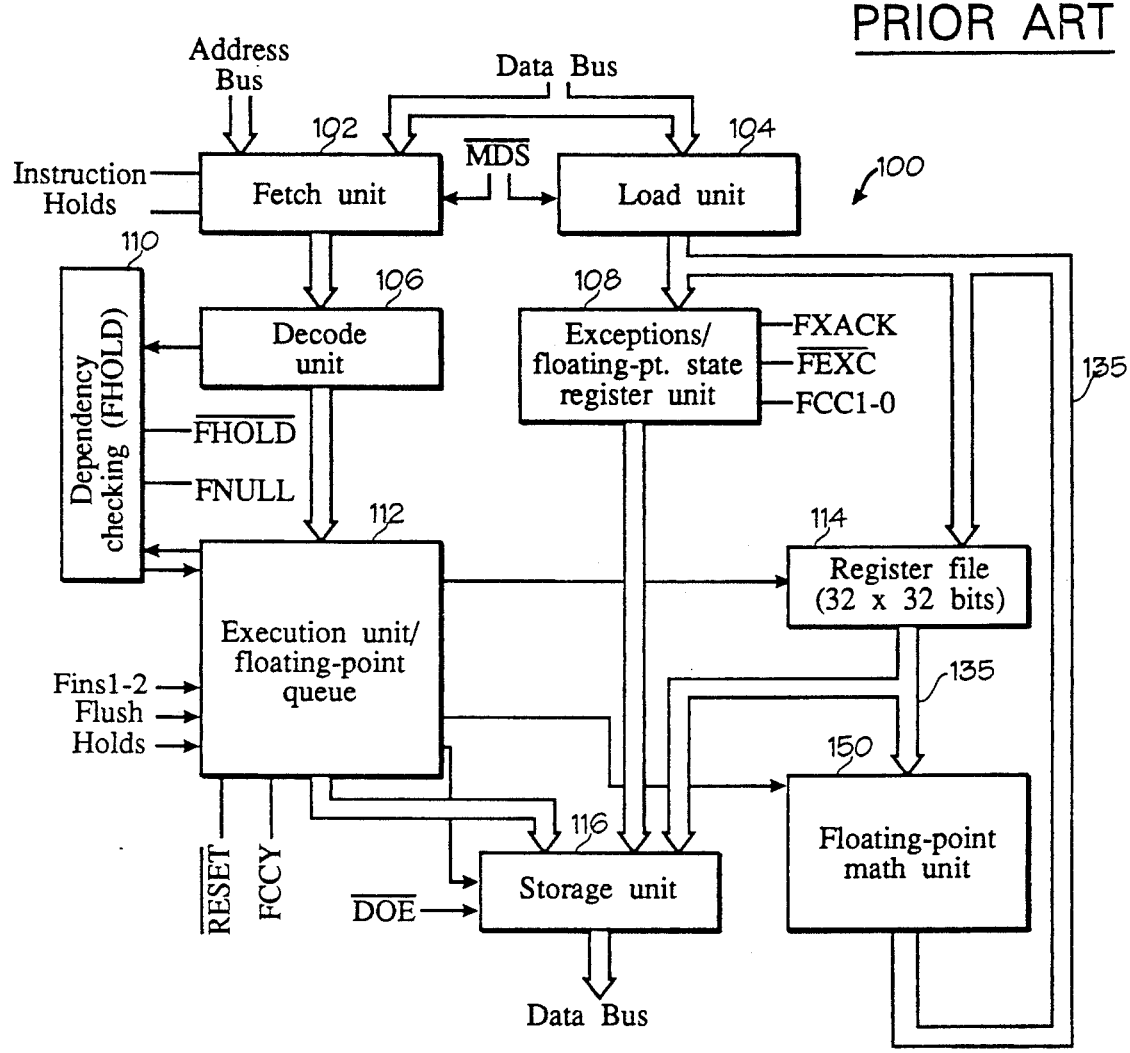
FIG. 1a is a top-level block diagram of a prior art floating-point co-processor.
Figure 1B:
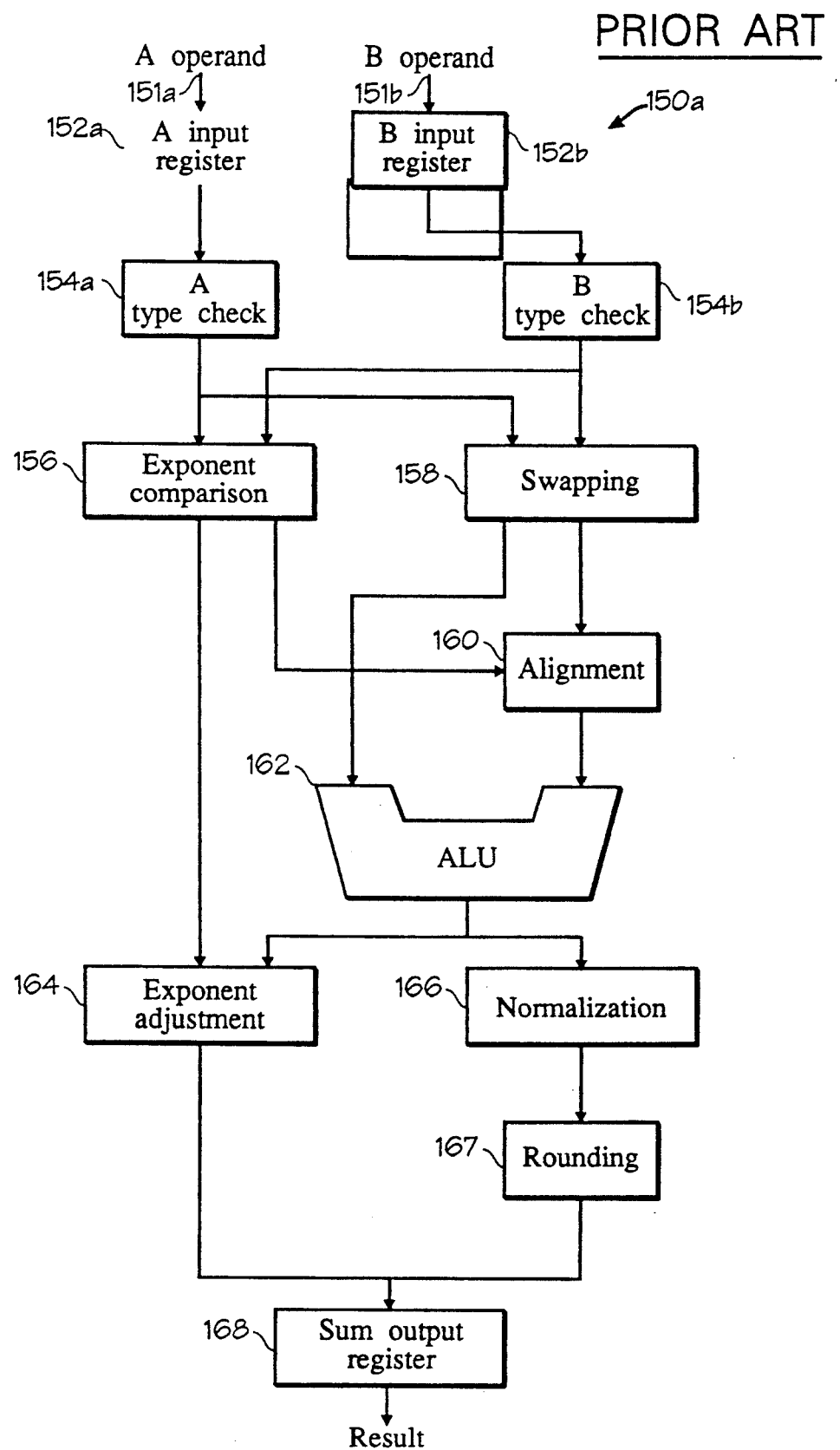
Figure 1C:
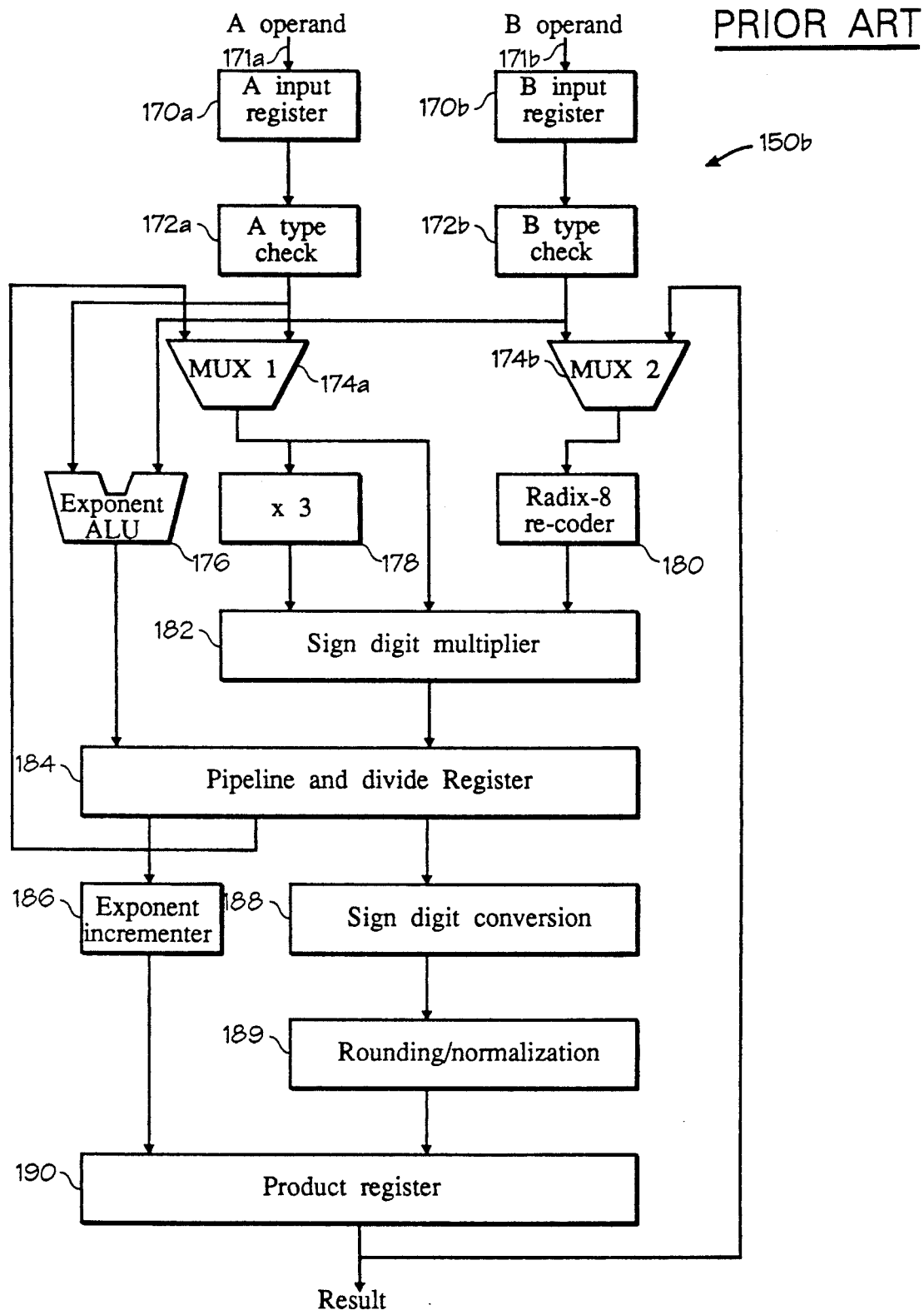
Figure 2A:
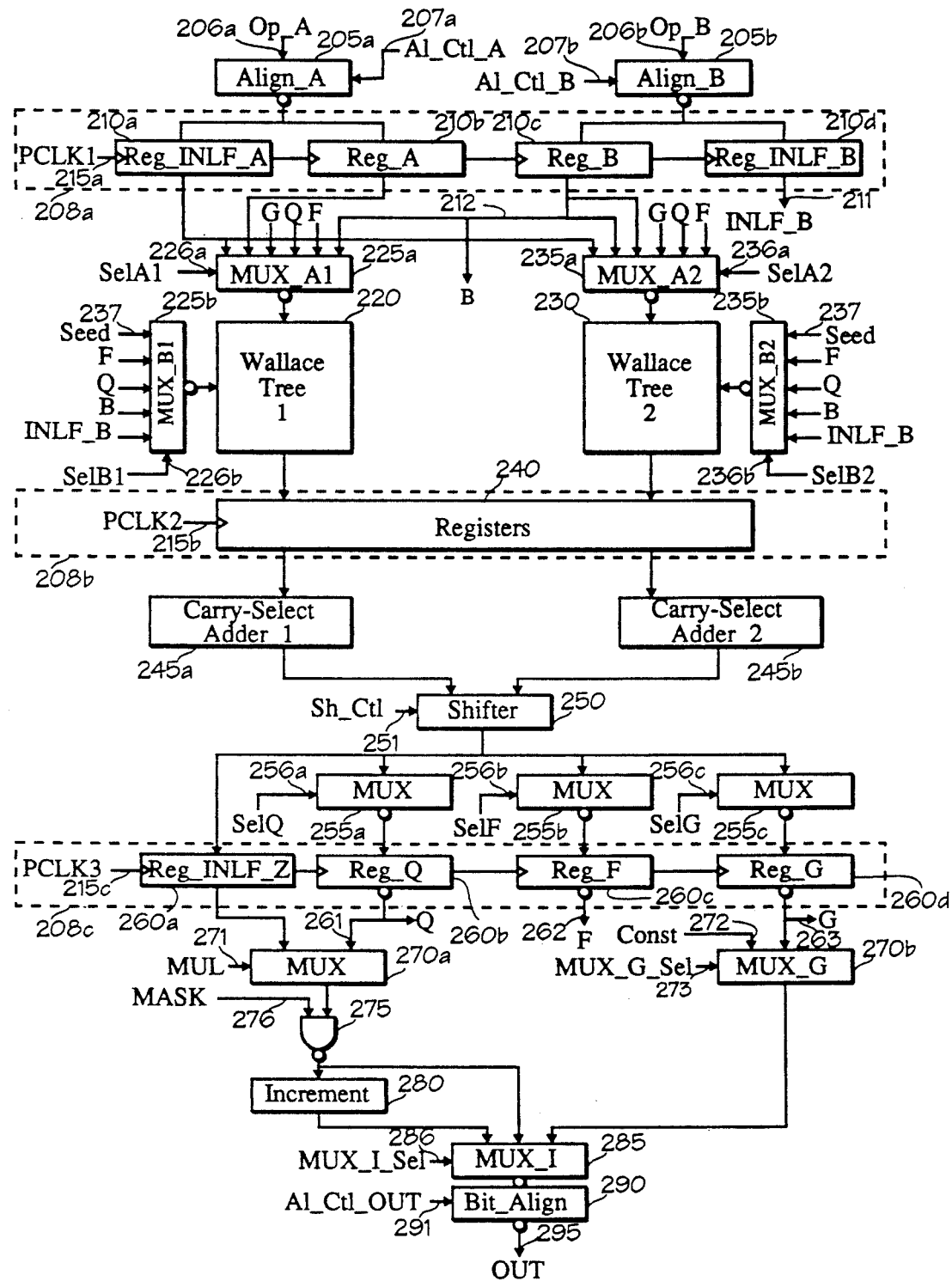
FIG. 2a is a block diagram of a floating point multiplier embodying the principles of the current invention.

FIG. 2a is a block diagram of a pipelined floating-point multiplier embodying the principles of the present invention. In the figure, all of the data paths are multi-bit in nature and single lines are used to represent the connection of multiple signals in parallel. Unless otherwise specified, all control signals, registers, inputs and outputs are multi-bit.

The design of the multiplier is such that either one extended precision multiplications or two shorter multiplications may be performed in any given clock cycle. Three sets of registers, generally indicated as 208a, 208b, and 208c, define separate pipeline stages of the multiplier. These register sets are clocked by clock signals "PCLK1" 215a, "PCLK2" 215b, and "PCLK3" 215c. These clocks all derive from the same clock source and are all in phase with one another.

This multiplier differs from prior art multipliers in three primary areas: 1) At least two input registers (at least one additional) are provided for each input operand rather than one. The second "extra" register permits storage of a values to be used in interleaved calculations; 2) Multiplexers at the inputs to the multiplication hardware are adapted to allow the selection of the extra input registers as input operands to the multiplier for an interleaved multiplication during pipeline bubbles in an iterative calculation; and 3) at least one extra output register is provided to hold the result of any interleaved multiplications.

Two floating-point input operands, "Op_A" 206a and "Op_B" 206b, are presented as inputs to the multiplier. Prior to being stored in inputs registers, each is passed through an alignment process. "Op_A" 206a is passed through alignment block "Align_A" 206a and "Op_B" is passed through an alignment block "Align_B" 206b. These alignment blocks compensate for the different bit layouts of differing floating-point formats (e.g., single precision values vs. double precision values), under the control of alignment control signals "Al_Ctl_A" 207a and "Al_Ctl_B" 207b, which select the appropriate bit alignment operation. The techniques involved in aligning floating point operands prior to multiplication are well known to those skilled in the art and are not discussed in detail herein.

Four input registers, "Reg_INLF_A" 210a, "Reg_A" 210b, "Reg_B" 210c, and "Reg_INLF_B" 210d, are provided to receive the input operands. These registers are commonly clocked by a clock signal "PCLK1" 215a, but are conditionally loadable, i.e., they are only loaded when a gating signal (not shown to reduce drawing clutter) is present. In this way each register is loaded only as directed externally. This conditional loading technique is well known to those skilled in the art. The addition of input registers "Reg_INLF_A" 210a and "Reg_INLF_B" 210d is an embodiment of one of the differences between prior-art floating-point multipliers and the present invention.

Two cascade-able Wallace Trees, "Wallace Tree 1" 220 and "Wallace Tree 2" 230, are provided, each having two inputs (one 30 bit input and one 60 bit input). Used separately, these act as individual 30 by 60 Wallace trees. Used in combination, they act as one 60 by 60 Wallace Tree. Therefore, either two 30 by 60 "single precision" multiplications or one 60 by 60 "double precision" (or extended precision) multiplication may be performed.

The outputs of the input registers are connected to inputs of four multiplexers, "MUX_A1" 225a, "MUX_B1" 225b, "MUX_A2" 235a, and "MUX_B2" 235b. "MUX_A1" 225a has at its inputs the outputs of "Reg_INLF_A" 210a, "Reg_A" 210b, "Reg_B" 210c, and register outputs "G" 263 (originating at "Reg_G" 260d, described hereinbelow), "F" 262 (originating at "Reg_F" 260c, described hereinbelow), and "Q" 261 (originating at "Reg_Q" 260b, described hereinbelow). Control signals "SelA1" 226a determine which of the inputs to "MUX_A1" 225a are placed at one input of "Wallace Tree 1" 220. "MUX_A2" 235a also has at its inputs the outputs of "Reg_INLF_A" 210a, "Reg_A" 210b, "Reg_B" 210c, and register outputs "G" 263, "F" 262, and "Q" 261. A second connection is shown to "MUX_A2" 235a from the output of "Reg_B" 210c. This connection is shifted one bit position to provide a "B/2" value, useful in some calculations. Control signals "SelA2" 236a determine which of the inputs to "MUX_A2" 236a are placed at one input of "Wallace Tree 2" 230. "MUX_B1" 225b has at its inputs an externally generated seed value "SEED" (allows an initial constant to be specified), and the register outputs "F" 262, "Q" 261, "B" 212 (originating at "Reg_B" 210c) and "INLF_B" 211 (originating at "Reg_INLF_B" 210d). Control signals "SelB1" determine which of the inputs for "MUX_B1" 225b are presented to the other input to "Wallace Tree 1" 220. "MUX_B2" 235b has at its inputs the same signals that are at the inputs of "MUX_B1" 225b. Control signals 236a determine which of the inputs of "MUX_B2" 235b are presented to the other input of "Wallace Tree 2" 230. (Because the externally generated SEED value may be either single or double precision, it may be assumed that different seed values may be presented to multiplexers 225b and 235b. Each is a different half of the same long seed value.)

The adaptation of multiplexers 225a, 225b, 235a, and 235b to permit selection of the values stored in "Reg_INLF_A" 210a and "Reg_INLF_B" 210d is an embodiment of another feature of the present invention which differs from floating-point multipliers of the prior art.

The "raw" outputs of "Wallace Tree 1" 220 and "Wallace Tree 2" 230, are latched by a set of registers 240. In order to complete the multiplication, the "raw" outputs must be summed in an adder.

The outputs of registers 240 corresponding to the outputs of "Wallace Tree 1" are connected to the inputs of a carry-select adder 245a. The outputs of register 240 corresponding to the outputs of "Wallace Tree 2" are connected to the inputs of another carry select adder 245b. These adders are cascade-able to form a single adder twice as wide as either one alone. An externally generated control signal (not shown) selects cascaded operation on a clock cycle by clock cycle basis.

The outputs of the two carry select adders are connected to a shifter 250 which optionally shifts its output one bit position with respect to its input according to the state of control signal "Sh_Ctl" 251. Three multiplexers 255a, 255b, and 255c have their inputs connected in common to the output of shifter 250. The purpose of these multiplexers is to select the outputs corresponding to carry select adder 245a alone, carry select adder 245b alone, or both in combination, depending upon whether the data of interest is from a 30 by 60 multiplication via Wallace tree 220, a 30 by 60 multiplication via Wallace Tree 230, or from an extended precision 60 by 60 multiplication involving both Wallace trees 220 and 230. The outputs of multiplexers 255a, 255b, and 255c are arranged such that for any of the three possible input types the bit orientation at their respective outputs will be arranged in a constant format. The output of multiplexer 255a connects to the input of a register "Reg_Q" 260b. The output of multiplexer 255b connects to the input of a register "Reg_F" 260c. The output of multiplexer 255c connects to the input of a register "Reg_G" 260d.

An additional register "Reg_INLF_Z" 260a connects directly to the output of shifter 250. (This connection assumes extended precision bit orientation, although an additional bit-orienting multiplexer could be provided between "Reg_INLF_Z" 2260a and shifter 250 if it were deemed necessary). This additional register 260a is used to store the results of interleaved multiplications, and is an embodiment of another feature of the present invention which distinguishes it from prior art floating-point multipliers.

The outputs "Q" 261 of "Reg_Q" 260b are connected back to the inputs of multiplexers 225a, 225b, 235a, and 235b, as previously described. Similar "feedback" connections are made with the outputs "F" 262 of "Reg_F" 260c, and with the outputs "G" 263 of "Reg_G" 260d. These outputs represent intermediate results of multiplications which may be "fed back" for use in iterative calculations such as divisions and square roots. "Reg_Q" 260b is the register ordinarily used for multiplication results, although intermediate results of iterative calculation will also be stored there on a temporary basis. "Reg_F" 260c and "Reg_G" are generally used for temporary storage of auxiliary intermediate values during iterative calculations.

In addition to the register connections just described, the outputs of "Reg_INLF_Z" 260a and "Reg_Q" 260b also connect to separate inputs of a multiplexer 270a. The control signal for this multiplexer (a single bit control) MUL 271 determines which of the two inputs ("Reg_INLF_Z" 260a outputs or "Reg_Q" 260b outputs) will be selected and presented at its output. The output of multiplexer 270a is passed through a masking array 275 (shown as a single gate, but representative of one gate per bit) whereby a MASK value 276 masks off unused bits (especially for single precision operations where not all bits are used). The output of masking array 275 is connected in common to one input of a multiplexer 285 and to the input of an incrementer 280, the output of which is connected to another input of multiplexer 285, permitting either an incremented or a non-incremented version of the output of the selected register contents to be selected at multiplexer 285, according to the state of control signals "MUX_I_SEL" 286.

The output "G" 263 of "Reg_G" 260d further connects to one input of a multiplexer "MUX_G" 270b. Another input of multiplexer 270b connects to an externally provided constant value (essentially the contents of a register located elsewhere). "MUX_G_Sel" 273, a single bit control signal, selects whether register output "G" 263 or constant value 272 is selected for output. The output of multiplexer "MUX_G" 270b connects to another input of multiplexer "MUX_I" 285, also selectable by control signal "MUX_I_Sel" 286. The output of "MUX_I" 285 is passed through an output bit alignment 290 which arranges the output bits in an appropriate output format, according to control signal "Al_Ctl_OUT" 291. This output bit alignment 290 is essentially the reverse of the process performed by "Align_A" 205a and "Align_B" 205b. The output of the alignment process 290 is the ultimate result of floating-point multiplication (or of an iterative process involving the multiplier) and is presented as an output floating point number "OUT" 295.

The sequencing of operations in the floating-point multiplication units is accomplished by providing controlling signals (e.g., "PCLK1" 215a, "Al_Ctl_A" 207a, "SelA1" 226a, "Sh_Ctl" 251, "SelQ" 256, "MUL" 271, etc.,) to the multiplier according to an established order of events suitable for accomplishing the goals of the operation or operations in progress. This order of events is determined by the type of operation to be accomplished. Single precision and double precision operands are handled slightly differently; simple multiplication requires a straightforward, simple sequence while division and square-root taking require longer, more involved sequences where intermediate values are fed back to the input of the multiplication unit. Different sequences provide different opportunities (bubbles) for interleaved multiplication. Typically these controlling signal sequences are provided by a sequential controller.

Figure 2B:
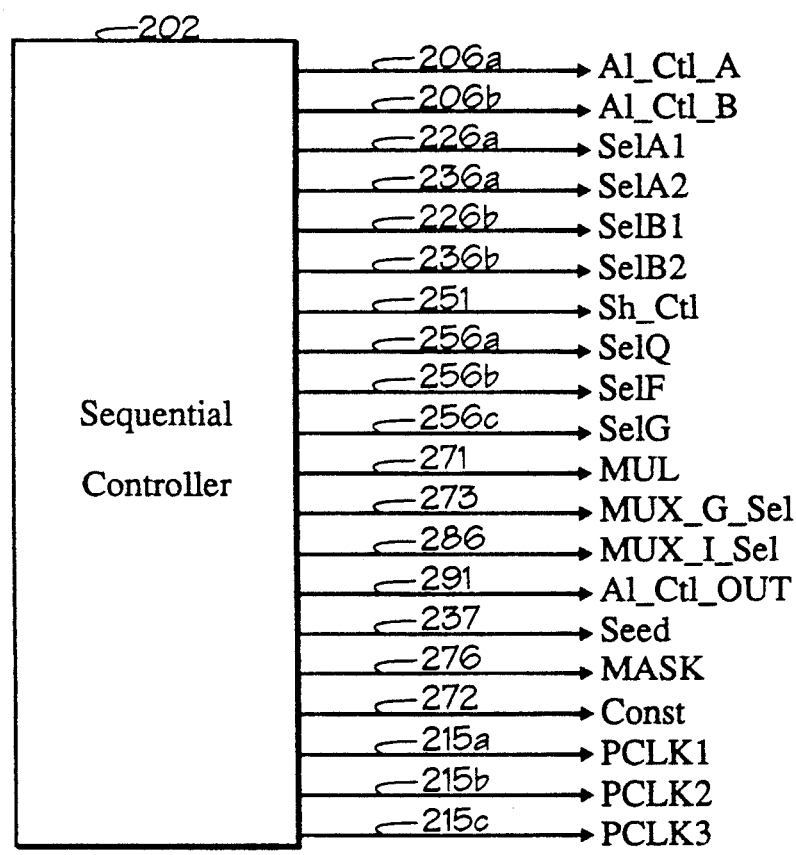

FIG. 2b depicts such a sequential controller 202 suited to control of the floating point multiplier of FIG. 2a, having a representative set of controlled output signals including: input alignment control signals "Al_Ctl_A" 206a and "Al_Ctl_B" 206b (see align blocks 205a and 205b); multiplexer selection control signals "SelA1" 226a, "SelB2" 226b, "SelA2" 236a, and "SelB2" 236b (see multiplexers 225a, 225b, 235a and 235b); shifter control signal "Sh_Ctl" 251 (see shifter 250); multiplexer selection control signals "SelQ" 256a, "SelF" 256b, and "SelG" 256c (see multiplexers 255a, 255b, and 255c); multiplexer select signals "MUL" 271, "MUX_G_Sel" 273, and "MUX_I_Sel" 286 (see multiplexers 270a, 270b, and 285); output alignment control signal "Al_Ctl_OUT" 291 (see output alignment process 290); a seed value 237; a mask value 276; a constant value 272; and three pipeline clocks "PCLK1" 215a, "PCLK2" 215b, and "PCLK3" 215c. (Typically all three pipeline clocks are provided as either the same clock signal or as derivatives of the same clock signal.)

Sequential controller 202 may be implemented by any of a number of techniques well known to those skilled in the art, such as a finite state machine or a programmed controller (e.g. CPU). The specifics of the sequences to be performed are determined by the specific operations which are required. Sequences for several specific cases are given hereinbelow in tables 2-7.

Tables 2-5 show typical sequences of mathematical steps to be performed by the pipelined multiplier (FIG.

2a), and are representative of iterative Goldschmidt algorithms as implemented on a floating point multiplier.

In these tables, the leftmost column is the "Step" number (loosely, an operation to be performed, regardless of the number of clock cycles it takes). The next column is the operation performed by the "left side" of the pipelined floating-point multiplier. (The term "left side" refers to the division of the Wallace trees and carry-select adders of the multiplier into two single-precision halves, where the left side is the half shown generally to the left of FIG. 2a including "Wallace Tree 1" 220 and carry-select adder 245a, and the right side is the half shown generally to the right of FIG. 2a including "Wallace Tree 2" 230 and carry-select adder 245b). The next column refers to the destination register for the result of the operation. The next two columns refer to the operation to be performed in the "right side" of the pipelined floating-point multiplier and the destination register for the result of that operation, respectively. The final column (EP?) refers to whether or not the operation is an extended precision operation (double precision operation using both halves of the multiplier). In the tables, "A" refers to the value in "Reg_A" 205a, "B" refers to the value in "Reg_B" 205b, and "Seed" refers to the seed value 237. Underlined entries indicate that a double precision operation is being performed using both halves of the multiplier. In the "operation" columns, "Q" refers to the value stored in the "Reg_Q" 260b. Similarly, "G" and/or "F" in those columns refer to the contents of "Reg_F" 260c, and/or "Reg_G" 260d, respectively. In the "result" columns, "Q" indicates that the result of the operation is to be stored in "Reg_Q" 260b. Similarly, "G" and/or "F" in those columns indicate that the operation is to be stored in "Reg_G" 260d and/or "Reg_F" 260c, respectively.

TABLE 2

| | Single Precision Divide Sequence | | | | |
|---|---|---|---|---|---|
| Step # | Left Side Operation | Left Result → | Right Side Operation | Right Result → | EP? |
| 1 | A * Seed | Q | B * Seed | G, F | N |
| 2 | Q * F | Q | G * F | G, F | N |
| 3 | $\underline{Q * F}$ | Q | $\underline{Q * F}$ | Q | Y |
| 4 | $\underline{A - Q * B}$ | OUT | $\underline{A - Q * B}$ | OUT | Y |

TABLE 3

| | Double (Extended) Precision Divide Sequence | | | | |
|---|---|---|---|---|---|
| Step # | Left Side Operation | Left Result → | Right Side Operation | Right Result → | EP? |
| 1 | A * Seed | Q | B * Seed | G, F | N |
| 2 | Q * F | Q | G * F | G, F | N |
| 3 | Q * F | Q | Q * F | G, F | N |
| 4 | $\underline{Q * F}$ | Q | $\underline{Q * F}$ | Q | Y |
| 5 | $\underline{A - Q * B}$ | OUT | $\underline{A - Q * B}$ | OUT | Y |

TABLE 4

| | Single Precision Square Root Sequence | | | | |
|---|---|---|---|---|---|
| Step # | Left Side Operation | Left Result → | Right Side Operation | Right Result → | EP? |
| 1 | B * seed | Q | B * seed$^2$ | F | N |
| 2 | Q * F | Q | F * F | F | N |
| 3 | — | — | G * F | G, F | N |

TABLE 4-continued

| | Single Precision Square Root Sequence | | | | |
|---|---|---|---|---|---|
| Step # | Left Side Operation | Left Result → | Right Side Operation | Right Result → | EP? |
| 4 | $\underline{Q * F}$ | Q | $\underline{Q * F}$ | Q | Y |
| 5 | $\underline{B - Q^2}$ | OUT | $\underline{B - Q^2}$ | OUT | Y |

TABLE 5

| | Double (Extended) Precision Square Root Sequence | | | | |
|---|---|---|---|---|---|
| Step # | Left Side Operation | Left Result → | Right Side Operation | Right Result → | EP? |
| 1 | B * Seed | Q | B * Seed$^2$ | G, F | N |
| 2 | Q * F | Q | F * F | F | N |
| 3 | $\underline{G * F}$ | G, F | $\underline{G * F}$ | G, F | Y |
| 4 | $\underline{Q * F}$ | Q | $\underline{Q * F}$ | Q | Y |
| 5 | $\underline{F * F}$ | F | $\underline{F * F}$ | F | Y |
| 6 | $\underline{G * F}$ | F | $\underline{G * F}$ | F | Y |
| 7 | $\underline{Q * F}$ | Q | $\underline{Q * F}$ | Q | Y |
| 8 | $\underline{B - Q^2}$ | OUT | $\underline{B - Q^2}$ | OUT | Y |

Tables 6 and 7 show cycle by cycle sequences for controlling the multiplier of FIG. 2a. The sequence in Table 6 corresponds to the single precision division presented in Table 2. The sequence in Table 7 corresponds to the double precision division presented in Table 3. These sequences incorporate interleaved multiplications inserted into what would otherwise be bubbles in the pipeline due to the nature of the iterative sequence. (These cycles may be recognized by the use of "IA" and "IB" multiplexer selection, indicating insertion of an interleaf value into the multiplier pipeline.) These sequences form the basis for the design of a sequential controller such as the one depicted in FIG. 2b. In the tables, the leftmost column shows the clock cycle number (each clock cycle is equal to one full cycle of PCLK1, PCLK2 and PCLK3 (FIGS. 2a-b)). The next column to the right shows which input of MUX_A1 (225a) is selected by control signal SelA1 (226a). The next column to the right shows which input of MUX_B1 (225b) is selected by control signal SelB1 (226b). The next column to the right shows which input of MUX_A2 (235a) is selected by control signal SelA2 (236a). The next column to the right shows which input of MUX_B2 (235b) is selected by control signal SelB2 (236b). For the four multiplexer select columns, an entry of "IA" indicates that the value stored in Reg_INLF_A (210a) is selected, an entry of "A" indicates that the value in Reg_A (210b) is selected, an entry of "B" indicates that the value in Reg_B (210c) is selected, an entry of "IB" indicates that the value in Reg_INLF_B (210d) is selected, and entries of "G", "F" or "Q" mean that the value in Reg_G (260d), Reg_F (260c), or RegQ (260b), respectively, is selected. An entry of "—" indicates an unused cycle.

The next four columns indicate the next contents of the pipeline registers Reg_INLF_Z (260a), RegQ (260b), RegF (260c), and RegG (260d), respectively. An entry of "—" indicates that the contents of the register will remain unchanged. An entry of "WT1" indicates that the results from the left half of the multiplier (from Wallace Tree 1 and carry-select adder 1) will be stored in the register. An entry of "WT2" indicates that the results from the right half of the multiplier (from Wallace Tree 2 and carry-select adder 2) will be stored in the register. An entry of "WX" indicates that a double precision result from both halves of the multiplier will be stored in the register. The "EP?" column represents whether or not the operation being performed is a double precision (extended precision) operation.

The "OUT" column indicates the presence of final results at the output of the multiplier. "D" represents a decrement value (used in an intermediate calculation), "IMn" represents the result of the "$n^{th}$" interleaved multiplication, and "R" represents the final result of the iterative operation performed by the sequence shown in the table.

TABLE 6

Single Precision Divide Timing (w/ interleaved multiply)

| CLK | MUX 1 Select | | MUX 2 Select | | Pipeline Register Enables | | | | EP? | OUT |
|---|---|---|---|---|---|---|---|---|---|---|
| | A1 | B1 | A2 | B2 | IZ | Q | F | G | | |
| 1 | A | S | B | S | — | — | — | — | N | — |
| 2 | IA | IB | IA | IB | — | WT1 | WT2 | WT2 | N | — |
| 3 | Q | F | G | F | WX | — | — | — | Y | — |
| 4 | IA | IB | IA | IB | — | WT1 | WT2 | WT2 | N | IM1 |
| 5 | Q | F | Q | F | WX | — | — | — | Y | — |
| 6 | IA | IB | IA | IB | — | WX | — | — | Y | IM2 |
| 7 | Q | B | Q | B | WX | — | — | — | Y | D |
| 8 | — | — | — | — | — | WX | — | — | — | IM3 |
| 9 | — | — | — | — | — | — | — | — | — | R |

TABLE 7

Double Precision Divide Timing (w/ interleaved multiply)

| CLK | MUX 1 Select | | MUX 2 Select | | Pipeline Register Enables | | | | EP? | OUT |
|---|---|---|---|---|---|---|---|---|---|---|
| | A1 | B1 | A2 | B2 | IZ | Q | F | G | | |
| 1 | A | S | B | S | — | — | — | — | N | — |
| 2 | IA | IB | IA | IB | — | WT1 | WT2 | WT2 | N | — |
| 3 | Q | F | G | F | WX | — | — | — | Y | — |
| 4 | IA | IB | IA | IB | — | WT1 | WT2 | WT2 | N | IM1 |
| 5 | Q | F | Q | F | WX | — | — | — | Y | — |
| 6 | IA | IB | IA | IB | — | WX | — | — | Y | IM2 |
| 7 | Q | B | Q3 | B | WX | — | — | — | Y | — |
| 8 | IA | IB | IA | IB | — | WX | — | — | Y | IM3 |
| 9 | Q | B | Q | B | WX | — | — | — | Y | D |
| 10 | — | — | — | — | — | WX | — | — | — | IM4 |
| 11 | — | — | — | — | — | — | — | — | — | R |

This technique may be applied to prior-art pipelined floating-point multipliers by:

1) adding at least one additional input register per input operand to hold interleaf operands;
2) providing means for selecting those interleaf operands as multiplier inputs during pipeline bubble cycles, thus initiating an interleaved multiplication; and
3) providing at least one additional register to receive the result of the interleaved multiplication when it appears at the output of the multiplier.

What is claimed is:

1. A method of interleaving at least one floating-point multiplication operation with an iterative floating-point operation comprising:
    providing an interleaved pipelined floating-point multiplier (pipelined multiplier) for performing an iterative floating point operation according to a control sequence, by:
        providing a plurality of pipeline multiplier stages, beginning with a first pipeline multiplier stage having a first input and a second input, continuing with subsequent pipeline multiplier stages, ending with a last subsequent pipeline multiplier stage which is a final pipeline multiplier stage;
    providing a first operand input register;
    providing a second operand input register;
    providing at least one interleaf first operand register;
    providing at least one interleaf second operand register;
    providing at least one fed-back interim value from at least one of said successive pipeline multiplier stages;
    selecting said first input of said first pipelined multiplier stage as one of: said first operand input register, said at least one interleaf first operand register, or said at least one fed-back interim value;
    selecting said second input of said first pipelined multiplier stage as one of: said second operand input register, said at least one interleaf second operand register, or said at least one fed-back interim value;
    said final pipeline multiplier stage has at least one "normal" register adapted to receive a final result from said pipelined multiplier; and
    said final pipeline multiplier stage also has at least one interleaf output register adapted to receive a final result from said pipelined multiplier;
further comprising:
    analyzing said iterative floating-point operation to identify cycles wherein said first pipelined multiplier stage is unused, said cycles being "bubble" cycles;
    selecting one interleaf first operand register and one interleaf second operand register as the first input and second input, respectively, to the first pipelined multiplier stage during each bubble cycle so identified in said iterative floating-point operation, thus initiating one interleaved multiplication for each bubble cycle, eventually producing one result at the final pipeline multiplier stage for each interleaved multiplication so initiated; and
    latching into at least one interleaf output register the result of each interleaved multiplication at the final pipeline multiplier stage.

2. The method of claim 1, wherein exactly one interleaf first operand register is provided.

3. The method of claim 1, wherein exactly one interleaf second operand register is provided.

4. The method of claim 1, wherein exactly one interleaf output register is provided.

5. The method of claim 1 wherein the iterative floating-point operation is a floating-point division.

6. The method of claim 1 wherein the iterative floating-point operation is square-root taking.

7. An interleaved pipelined floating-point multiplier (pipelined multiplier) for performing an iterative floating point operation and an interleaved multiplication comprising:
    a plurality of pipeline multiplier stages, beginning with a first pipeline multiplier stage having a first input and a second input, continuing with subsequent pipeline multiplier stages, ending with a last subsequent pipeline multiplier stage which is a final pipeline multiplier stage;
    a first operand input register;
    a second operand input register;

at least one interleaf first operand register;
at least one interleaf second operand register;
at least one of said successive pipeline multiplier stage provides at least one fed-back interim value;
means for selecting said first input of said first pipelined multiplier stage as one of: said first operand input register, said at least one interleaf first operand register, or said at least one successive pipeline multiplier stage;
means for selecting said second input of said first pipelined multiplier stage as one of: said second operand input register, said at least one interleaf second operand register, or said at least one successive pipeline multiplier stage;

said final pipeline multiplier stage has at least one "normal" register adapted to receive a final result from said pipelined multiplier; and
said final pipeline multiplier stage also has at least one interleaf output register adapted to receive a final result from said pipelined multiplier.

8. The interleaved pipelined floating-point multiplier of claim 7, having exactly one interleaf first operand register.

9. The interleaved pipelined floating-point multiplier of claim 7, having exactly one interleaf second operand register.

10. The interleaved pipelined floating-point multiplier of claim 7, having exactly one interleaf output register.